(12) United States Patent
Chau

(10) Patent No.: US 8,751,301 B1
(45) Date of Patent: Jun. 10, 2014

(54) BANNER ADVERTISING IN SPHERICAL PANORAMAS

(75) Inventor: Stephen Chau, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 142 days.

(21) Appl. No.: 13/229,341

(22) Filed: Sep. 9, 2011

(51) Int. Cl.
*G06Q 30/02* (2012.01)
*G06Q 30/00* (2012.01)

(52) U.S. Cl.
USPC .................. 705/14.4; 705/14.57; 705/73

(58) Field of Classification Search
USPC .................. 705/14.57, 14.5, 14.73
See application file for complete search history.

(56) References Cited

U.S. PATENT DOCUMENTS

| | | | | |
|---|---|---|---|---|
| 2006/0241859 | A1* | 10/2006 | Kimchi et al. | 701/208 |
| 2007/0083408 | A1* | 4/2007 | Altberg et al. | 705/7 |
| 2007/0083428 | A1* | 4/2007 | Goldstein | 705/14 |

* cited by examiner

*Primary Examiner* — Naresh Vig
(74) *Attorney, Agent, or Firm* — Lerner, David, Littenberg, Krumholz & Mentlik, LLP

(57) ABSTRACT

Systems, methods, and computer storage mediums for placing advertisements on photographic images of geolocations. The method includes retrieving a photographic image associated with a geolocation, where the geolocation is based on a user action. An advertisement to place on the photographic image is also retrieved based on at least the geolocation. The photographic image is then analyzed to determine a position on the photographic image for placing the advertisement. Finally, the advertisement is placed at the determined position on the photographic image.

24 Claims, 6 Drawing Sheets

BANNER ADVERTISING IN SPHERICAL PANORAMAS

BACKGROUND

Traditionally, banner advertisements have been located at the top and/or bottom of webpages. These banner advertisements have proven useful to advertisers wishing to market their products and services. Banner advertisements differ from other types of web-based advertisements in that they are retrieved by URL links that are included in a webpage. The banner advertisements are also placed in a predefined, hard-coded position on the webpage, such as the top or the bottom.

BRIEF SUMMARY

Photographic images of geolocations made available through geographic information systems have not previously been used to display banner advertisements. Many of these photographic images include portions such as, for example, the top and bottom, that can be utilized for banner advertisements. The advertisements can be selected and displayed based on a number of factors such as, for example, the geolocation corresponding to the photographic image.

The embodiments described below include systems, methods, and computer storage mediums for placing advertisements on photographic images of geolocations. An exemplary method includes retrieving a photographic image associated with a geolocation, where the geolocation is based on a user action. An advertisement to place on the photographic image is also retrieved based on at least the geolocation. The photographic image is then analyzed to determine a position on the photographic image for placing the advertisement. Finally, the advertisement is placed at the determined position on the photographic image.

Further features and advantages of this invention described herein, as well as the structure and operation of various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1A:
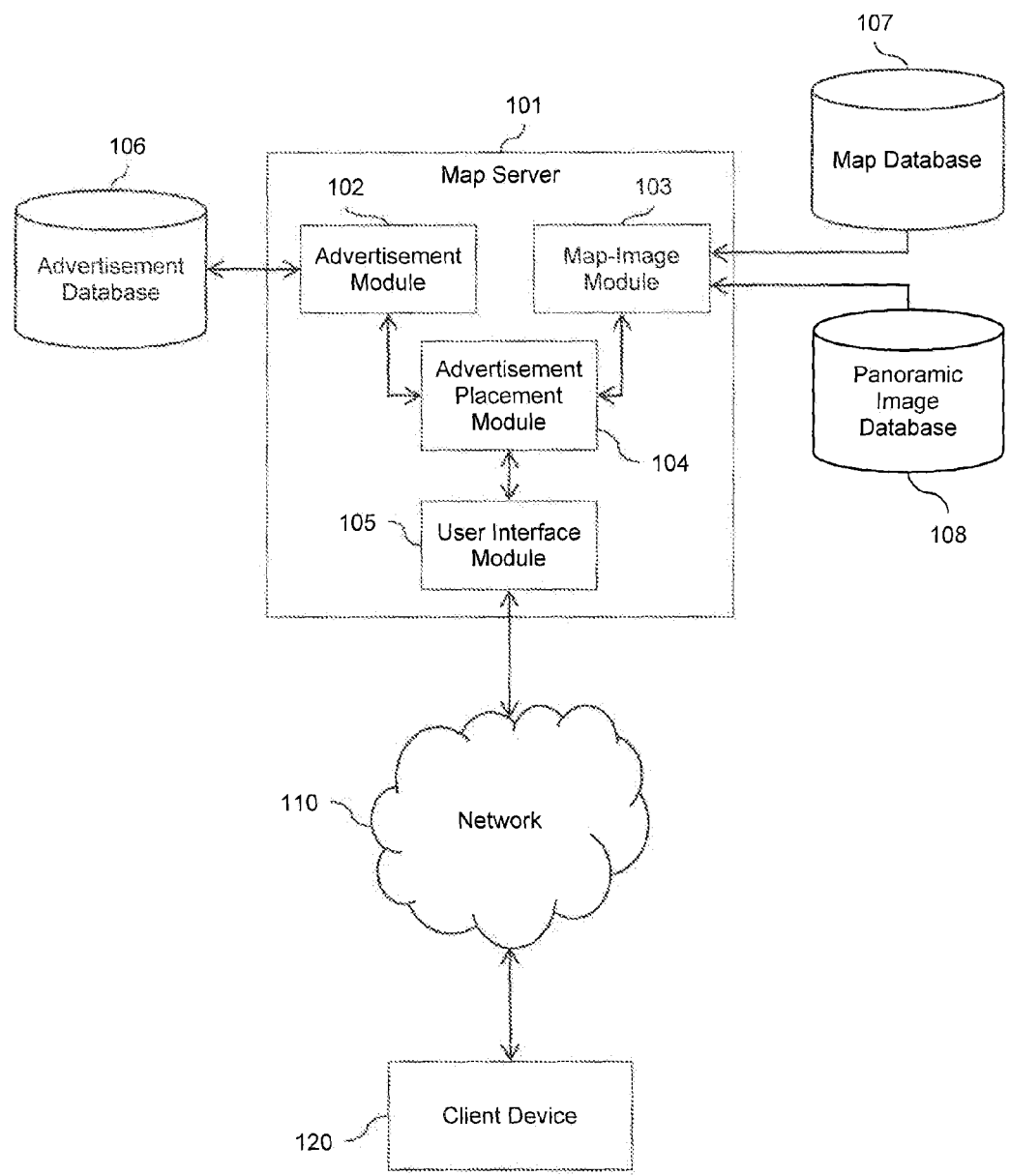
FIG. 1A is an example system environment that may be used to place advertisements on photographic images of geolocations.

In the following detailed description, references to "one embodiment," "an embodiment," "an example embodiment," etc., indicate that the embodiment described may include a particular feature, structure, or characteristic. Every embodiment, however, may not necessarily include the particular feature, structure, or characteristic. Thus, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

The embodiments and accompanying figures described below generally relate to placing advertisements on photographic images of geolocations. In one embodiment, a photographic image associated with a geolocation and an advertisement based on the geolocation are retrieved from one or more databases. The photographic image is then analyzed to determine a position on the photographic image for placing the advertisement. The advertisement is then placed at the determined position on the photographic image.

This Detailed Description is divided into sections. The first and second sections describe example system and method embodiments that may be used to retrieve and place advertisements on photographic images of geolocations. The third section describes exemplary interfaces that can be used to carry out the embodiments described herein. The fourth section describes an example computer system that may be used to implement the embodiments described herein.

Example System Embodiments

FIG. 1 is an example system environment 100 that may be used to place advertisements on photographic images of geolocations. System 100 includes map server 101. Map server 101 includes advertisement module 102, map-image module 103, advertisement placement module 104, and user interface module 105. System 100 also includes advertisement database 106, map database 107, panoramic image database 108, network 110, and client device 120.

Network 110 can include any network or combination of networks that can carry data communication. These networks can include, for example, a local area network (LAN) or a wide area network (WAN), such as the Internet. LAN and WAN networks can include any combination of wired (e.g., Ethernet) or wireless (e.g., Wi-Fi or 3G) network components.

Client device 120 can include any computing device capable of communicating with a geographic information system ("GIS") including, for example, stationary computing devices (e.g., desktop computers) and mobile computing devices such as, for example, tablets, smartphones, or other network enabled portable digital devices. Mobile computing devices may utilize Global Positioning System ("GPS") data, touch-screen interfaces, and location services to assist with retrieving and displaying geolocation images and advertising units. Each of map server 101, client device 120, advertisement database 106, map database 107, and panoramic image database 108 also can run on any computing device. Each component may run on a distribution of computer devices or a single computer device. Examples of computing devices include, but are not limited to, a central processing unit, an application-specific integrated circuit, a computer, workstation, distributed computing system, computer cluster, embedded system, stand-alone electronic device, networked device, mobile device (e.g. mobile phone, smart phone, personal digital assistant (PDA), navigation device, tablet or mobile computing device), rack server, set-top box, or other type of computer system having at least one processor and memory. A computing process performed by a clustered computing environment or server farm may be carried out across multiple processors located at the same or different locations. Hardware can include, but is not limited to, a processor, memory and user interface display.

A. Map Server

Map server 101 can be any GIS capable of capturing, storing, manipulating, analyzing, managing, and presenting geographically referenced data. Map server 101 includes advertisement module 102, map-image module 103, advertisement placement module 104, and user interface module 105. These modules, however, are not intended to limit the embodiments described herein. Consequently, one of skill in the art will readily understand how the functionality described herein may be implemented by using one or more alternative modules.

1. Map-Image Module

Map server 101 includes map-image module 103 that is configured to retrieve a photographic image associated with a geolocation, where the geolocation is determined based on a user action. The photographic image can include either one image or a combination of images with fields of view up to and including 360 degrees. The photographic image can be associated with the geolocation coordinates of the image capture device when the image was captured. The geolocation coordinates can then be used to retrieve the photographic image from a database, such as, for example, panoramic image database 108.

In some embodiments, the user action can include changes in the user's geolocation. For example, the user's geolocation can be determined based on GPS data collected from client device 120. Map-image module 103 can utilize this GPS data to retrieve an image that corresponds to the user's geolocation.

In some embodiments, the user action can include a touch-screen gesture. For example, the user may view an image of a first geolocation on a mobile device configured to accept touch gestures. The user can then navigate to a second geolocation via a touch gesture such as, for example, panning the image, whereby map-image module 103 will retrieve an image that corresponds to the second geolocation.

In some embodiments, the user action can include a user selection. For example, the user can select a point on a map that can be utilized by map-image module 103 to determine the geolocation. This example is described in more detail in reference to FIG. 3, herein. The user action can also include the user selecting a point within an image of a neighboring geolocation. This example is described in more detail in reference to FIG. 4, herein. Additionally, in some embodiments, the user may select a URL link that navigates the user to a webpage that includes a map that references a geolocation or a photographic image of a geolocation.

Map-image module 103 may also be configured to retrieve a map or other geographically referenced data. This information may be acquired from a database such as, for example, map database 107. In one embodiment, map image module 103 retrieves a map and additional data indicating the geolocations on the map that have corresponding photographic images. The map and additional data may be made available for display to a user via user interface module 105. The additional data is not limited to indicating which geolocations have corresponding photographic images, but may also include business locations, street names, addresses, traffic information, or other useful geographically referenced data.

2. Advertisement Module

Map server 101 also includes advertisement module 102 that is configured to retrieve one or more advertisements to place on the photographic image. The advertisements may be stored with a collection of advertisements in a database such as, for example, advertisement database 106. The advertisements can be associated with an advertiser and can be based on various pricing models including, for example, cost-per-click (CPC) and cost-per-impression (CPM). A CPC pricing model charges the advertiser each time a user selects an advertisement associated with the advertiser. A CPM pricing model charges the advertiser each time an advertisement associated with the advertiser is displayed.

In some embodiments, the advertisements are retrieved based on the geolocation selected by a user. For example, if the user selects a geolocation from a map that corresponds to an intersection of two streets, advertisement module 102 may retrieve one or more advertisements associated with advertisers having business locations along the two streets.

In some embodiments, advertisements are retrieved based on one or more target factors. Target factors can be determined from information associated with a user such as, for example, a user profile. The user profile may store information such as, for example, previous searches conducted by the user, websites visited by the user, the location of the user, and demographic information about the user. When the user chooses to view a photographic image of a geolocation, advertisement module 102 may utilize the user's profile to retrieve a targeted advertisement. For example, if a user previously conducted a search for hotels at a location, advertisement module 102 may attempt to retrieve advertisements for hotels with locations proximate to the selected geolocation. Other information associated with a user may be used in a similar fashion to retrieve advertisements.

Target factors can also be determined from information associated with an advertiser such as, for example, a geographical range, a product or service category, key words, or target advertising demographics. This information may be stored with each advertisement or may be stored in an advertiser's profile. Advertisement module 102 may then utilize this information to select an advertisement targeted to information associated with the user and/or a geolocation selected by the user. For example, if a user previously conducted a search for hotels at a location, advertisement module 102 may locate advertisements from advertisers offering hotel services proximate to the geolocation selected by the user. Other information associated with an advertiser may be used in a similar fashion to retrieve advertisements.

In some embodiments, advertisements may be retrieved based on the outcome of an auction. The auction may allow multiple advertisers to compete for advertising space on a photographic image of a geolocation. The outcome of the auction may be based on information associated with the advertiser such as, for example, a geographical range, a product or service category, key words, or target advertising demographics. The outcome may also be based on, for example, the pricing model of the auction such as, for example, CPC or CPM, the price an advertiser is willing to pay, and/or the likelihood of a user selecting the advertisement.

3. Advertisement Placement Module

Map server 101 further includes advertisement placement module 104 that is configured to analyze a photographic image of a geolocation to determine a position on the photographic image for overlaying the advertisement. In some embodiments, advertisement placement module 104 analyzes the photographic image to determine the location of the top and/or the bottom of the image. For example, depending on the size of the advertisement, advertisement placement module 104 may determine a position at the very top or very bottom of the photographic image for placing the advertisement.

In some embodiments, advertisement placement module 104 analyzes the pixels of the photographic image to determine a location that is not within an area of interest to the user. For example, if the photographic image includes a building such as a landmark, advertisement placement module 104 may analyze the image to determine a position for placing the advertisement that does not include the landmark.

To analyze the photographic image, advertisement placement module 104 may consider data included with the image. In some embodiments, data may be included with the image that describes the scene captured in the image. For example, the data may include a distance value for one or more pixels in the image that indicates the distance between an object captured in the image and the image capture device. This data can be utilized to determine objects in the image such as, for example, streets, sidewalks, the sky, and other areas that may not be of interest to the user.

In some embodiments, advertisement placement module 104 will analyze the photographic image to locate pixels that represent the background of the photographic image. The background may include objects such as streets, sidewalks, and areas above and below a horizon line. These pixels may be located by comparing the color of each pixel with its neighboring pixels. Streets, for example, may be located by identifying large groups of similarly colored pixels positioned toward the bottom of the image. The areas above and below the horizon line, for example, may be located by first identifying the horizon line and then identifying the area above and below the horizon line. Horizon lines may be located by, for example, identifying a color change occurring along an approximately straight line across the photographic image. Other useful ways for locating objects in an image may also include the embodiments described in U.S. patent application Ser. No. 13/187,193, which is incorporated herein in its entirety.

Advertisement placement module 104 is also configured to place the advertisement at the determined position on the photographic image once a position for placing the advertisement is determined. The advertisement may be placed on the photographic image by any image placement technique understood by a person of skill in the art.

4. User Interface Module

Map server 101 also includes user interface module 105. User interface module 105 is configured to display maps, geographically referenced data, and photographic images provided by map-image module 103 and advertisements provided by advertisement module 102.

User interface module 105 may also be configured to allow a user to select geolocations from either a map or a photographic image of a geolocation. Example embodiments are described below in reference to FIGS. 3 and 4.

User interface module 105 may also be configured to allow the user to select an advertisement placed on a photographic image. In some embodiments, when a user selects an advertisement, user interface module 105 directs the user to information associated with the advertisement. This may include, for example, navigating the user to an advertiser's landing webpage or another webpage designated by the advertisement.

B. Client Device Embodiment

Figure 1B:
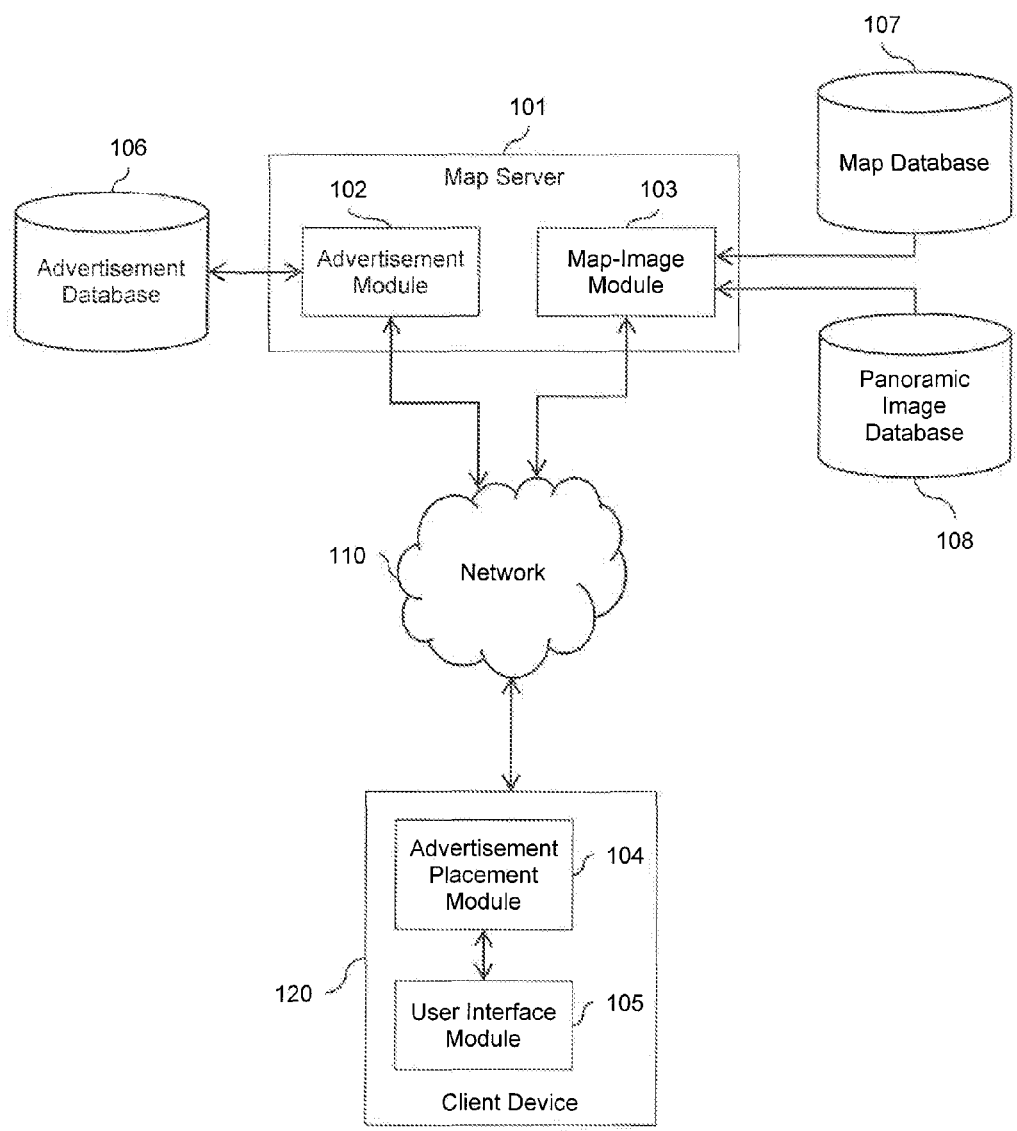
FIG. 1B is another example system environment that may be used to place advertisements on photographic images of geolocations.

FIG. 1B is an example system environment 100B that may be used to direct a user to an image of an advertiser's geolocation. System 100B includes map server 101. Map server 101 includes advertisement module 102 and map-image module 103. System 100B also includes advertisement database 106, map database 107, panoramic image database 108, network 110, and client device 120. Client device 120 includes advertisement placement module 104 and user interface module 105.

System 100B operates in a similar manner to system 100A except that the functions of advertisement placement module 104 and user interface module 105 are carried out by client device 120.

Advertisement placement module 104 communicates with advertisement module 102 and map-image module 103 via network 110. Advertisement placement module 104 retrieves a photographic image of a geolocation from map-image module 103. Advertisement placement module 104 also retrieves one or more advertisements from advertisement module 102. Advertisement placement module 104 then determines where to place the one or more advertisements on the photographic image using one of the placement techniques described above. The photographic image and the one or more advertisements are then displayed using user interface module 105 with the advertisements displayed in the determined locations.

Various aspects of embodiments described herein can be implemented by software, firmware, hardware, or a combination thereof. The embodiments, or portions thereof, can also be implemented as computer-readable code. For example, advertisement unit module 102, map-image module 103, advertisement placement module 104, and user interface module 105 may be implemented in one or more computer systems or other processing systems. The embodiments in systems 100A and 100B are not intended to be limiting in any way.

Example Method Embodiments

Figure 2:
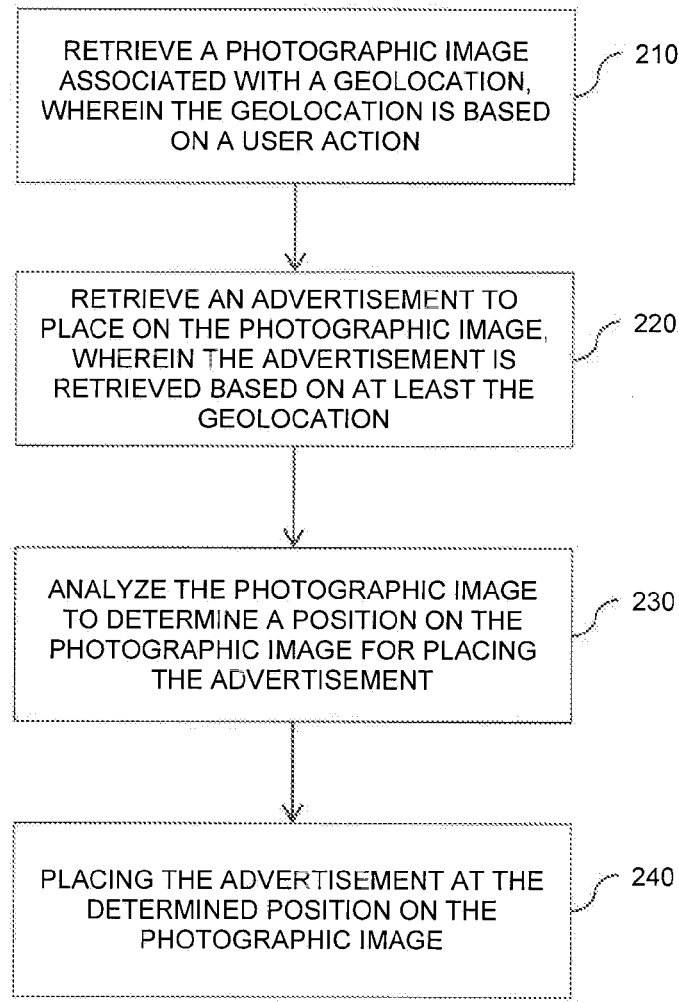
FIG. 2 is a flowchart illustrating an exemplary method for placing advertisements on photographic images of geolocations.

FIG. 2 is a flowchart illustrating an exemplary method 200 for placing advertisements on photographic images of geolocations. While method 200 is described with respect to one embodiment, method 200 is not meant to be limiting and may be used in other applications. Additionally, method 200 may be carried out by systems 100A or B, for example.

Method 200 retrieves a photographic image associated with a geolocation, where the geolocation is based on a user action (step 210). In some embodiments, the user action is based on the user selecting a point on a map or a point in a photographic image of a geolocation. In some embodiments, the user action is based on the user selecting a URL link that navigates that user to a webpage that includes a map referencing a geolocation or a photographic image of a geolocation. In some embodiments, the user action is based on the user's geolocation. Step 210 may be carried out by map-image module 103 embodied in systems 100A or 100B, for example.

Method 200 also retrieves one or more advertisements to place on the photographic image (step 220). In some embodiments, the advertisements are retrieved based on the geolocation selected by the user, information associated with the user, information associated with the advertiser, and/or the outcome of an auction between advertisers. Step 220 may be carried out by advertisement module 102 embodied in systems 100A or 100B, for example.

Method 200 then analyzes the photographic image to determine a position on the photographic image for placing the advertisement. In some embodiments, the position is determined by using data included with the photographic image or by comparing each pixel in the image to its neighboring pixels. Step 230 may be carried out by advertisement placement module 104 embodied in systems 100A or 100B, for example.

Finally, method 200 places the advertisement at the determined position on the photographic image. Any method for placing one image on another image may be used. These placement techniques would be understood by a person of skill in the art. Step 240 may be carried out by advertisement placement module 104 embodied in systems 100A or 100B, for example.

Additional Example Embodiments

While system 100A embodied in FIG. 1A shows map server 101 including advertisement module 102, map-image module 103, advertisement placement module 104, and user interface module 105, map server 101 can include more or fewer modules. Similarly, while system 100B embodied in FIG. 1B shows map server 101 including advertisement module 102 and map-image module 103, and client device 120 including advertisement placement module 104 and user interface module 105, map server 101 and client device 120 can also include more or fewer modules. Additionally, map server 101 and client device 120 may each include a combination of the modules described above.

Below are example interfaces that may be used to implement the embodiments described with reference to systems 100A and 100B, and method 200.

A. Example Map Interface

Figure 3:
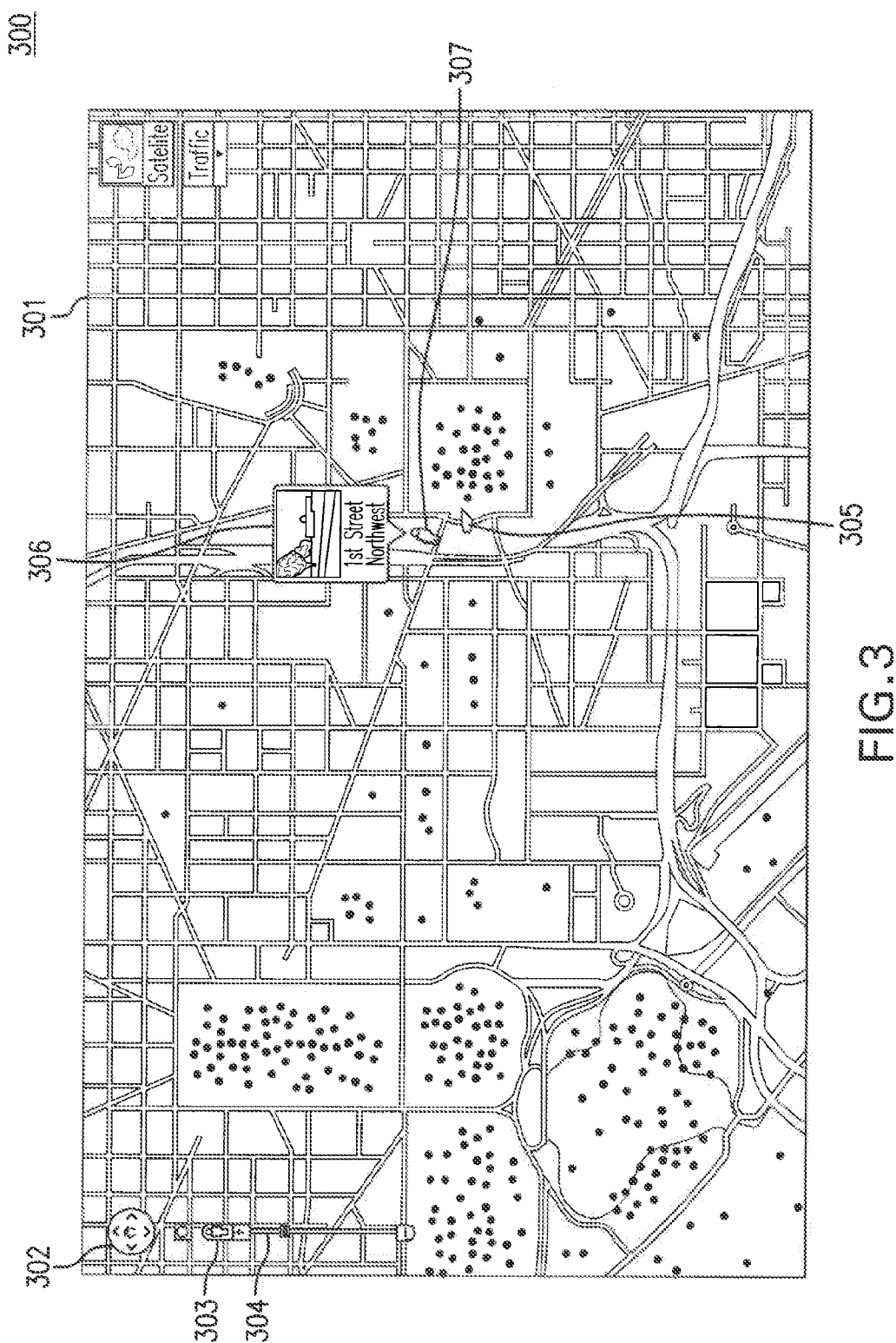
FIG. 3 is an example map interface that may be used to allow a user to select a geolocation, according to one embodiment

FIG. 3 is an example map interface 300 that may be used to allow a user to select a geolocation, according to one embodiment. Map interface 300 includes map 301, compass 302, pegman selector 303, scale control 304, orientation indicator 305, preview 306, and pegman 307.

In some embodiments, map 301 is retrieved from map database 107 by map-image module 103. Once map-image module retrieves map 301, map 301 can be displayed to a user through user interface module 105 via advertisement placement module 104. User interface module 105 may then add one or more interface elements to map 301 such as, for example, compass 302, pegman selector 303, scale control 304, orientation indicator 305, preview 306, and pegman 307.

Compass 302 may be used to either rotate map 301 to an alternate orientation or pan map 301. Pegman selector 303 may be used to select pegman 307 for placing onto map 301. Scale control 304 may be used to change the zoom factor of map 301. Orientation indicator 305 may be used to indicate the anticipated orientation of a photographic image that will be displayed when pegman 307 is placed on map 301. Preview 306 may be used to show a thumbnail image of a photographic image that corresponds to the geolocation indicated by pegman 307. Pegman 307 may be used to select a point on map 301 and retrieve a photographic image of a geolocation that corresponds to the selected point. Some or all of these interface elements may be included in one or more embodiments. Additionally, map interface 300 is not intended to limit the embodiments described herein.

B. Example Panoramic Interface

Figure 4:
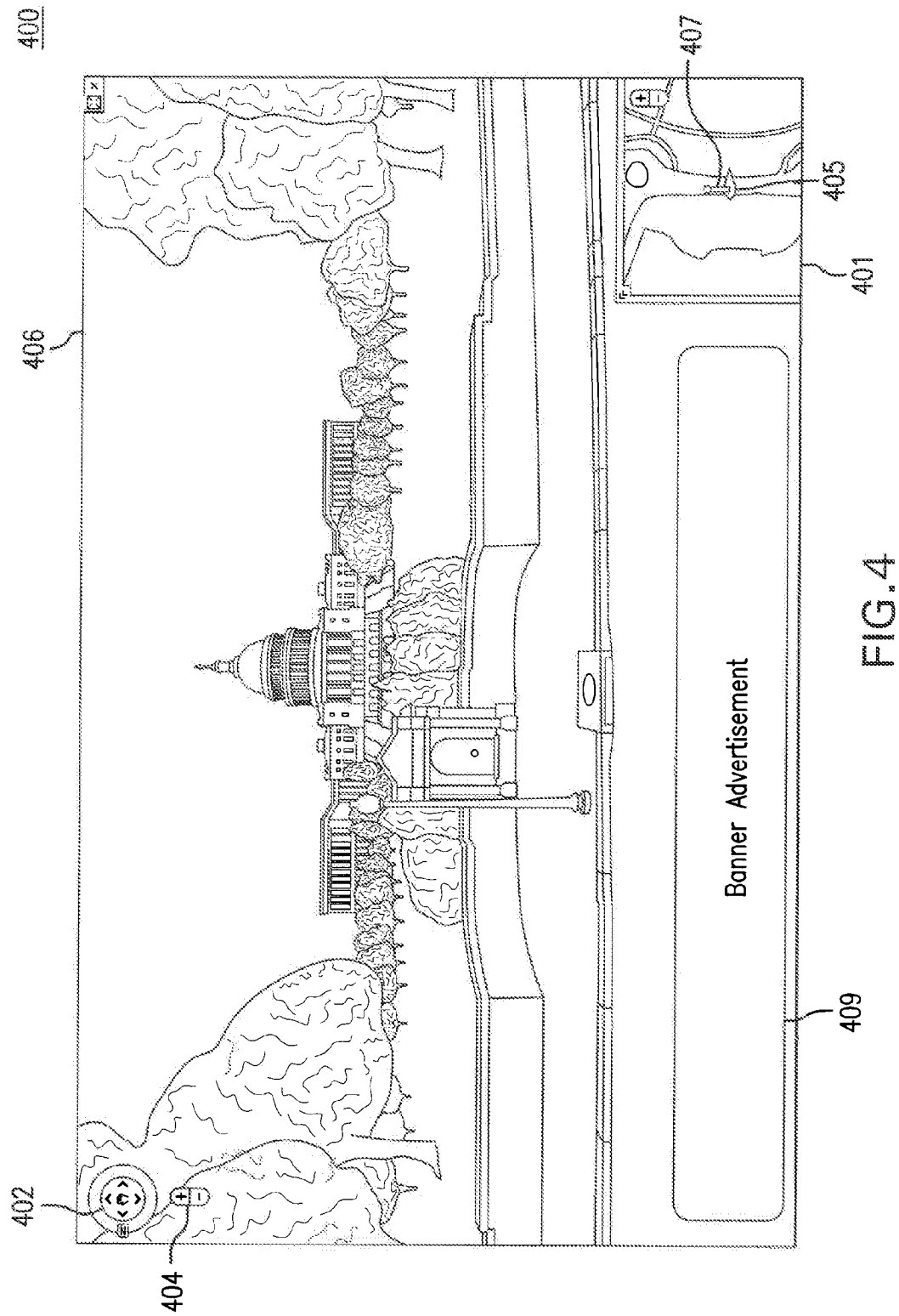
FIG. 4 is an example panoramic interface of a geolocation that includes a photographic image and an example advertisement that is placed on the image, according to one embodiment.

FIG. 4 is an example panoramic interface 400 of a geolocation that includes a photographic image and an example advertisement that is placed on the image, according to one embodiment. Panoramic interface 400 includes map 401, compass 402, image scale control 404, orientation indicator 405, panoramic image 406, pegman 407, and advertisement 409.

In some embodiments, panoramic image 406 is retrieved from panoramic image database 108 by map-image module 103. Advertisement 409 is also retrieved from advertisement database 106 by advertisement module 102. Advertisement placement module 104 then places advertisement 409 onto panoramic image 406. Panoramic image 406 is then displayed to a user through user interface module 105 via advertisement placement module 104. User interface module 105 may add one or more interface elements to panoramic image 406 such as, for example, map 401, compass 402, scale control 404, orientation indicator 405, and pegman 407.

Compass 402 may be used to either rotate the map 401 to an alternate orientation or select a new geolocation. Scale control 404 may be used to change either the zoom factor of map 401 or the zoom factor of panoramic image 406. Orientation indicator 405 may be used to indicate the current orientation of panoramic image 406. Panoramic image 406 may be used to show the photographic image corresponding to the geolocation selected by a user. Pegman 407 may be used to indicate the geolocation on map 401 that corresponds to panoramic image 406.

Panoramic interface 400 may also include interface controls that allow a user to select points within panoramic image 406 and navigation controls to navigate through neighboring panoramic images. If a point within panoramic image 406 is selected, a panoramic image corresponding to the selected point may be displayed with a placed advertisement. If the user navigates to a neighboring panoramic image, the neighboring image may be displayed with a placed advertisement. Other interface controls may also be provided to assist with navigating through panoramic images.

Some or all of the interface elements and controls described herein may be included in one or more embodiments. Additionally, panoramic interface 400 is not intended to limit the embodiments described herein.

Example Computer System

Figure 5:
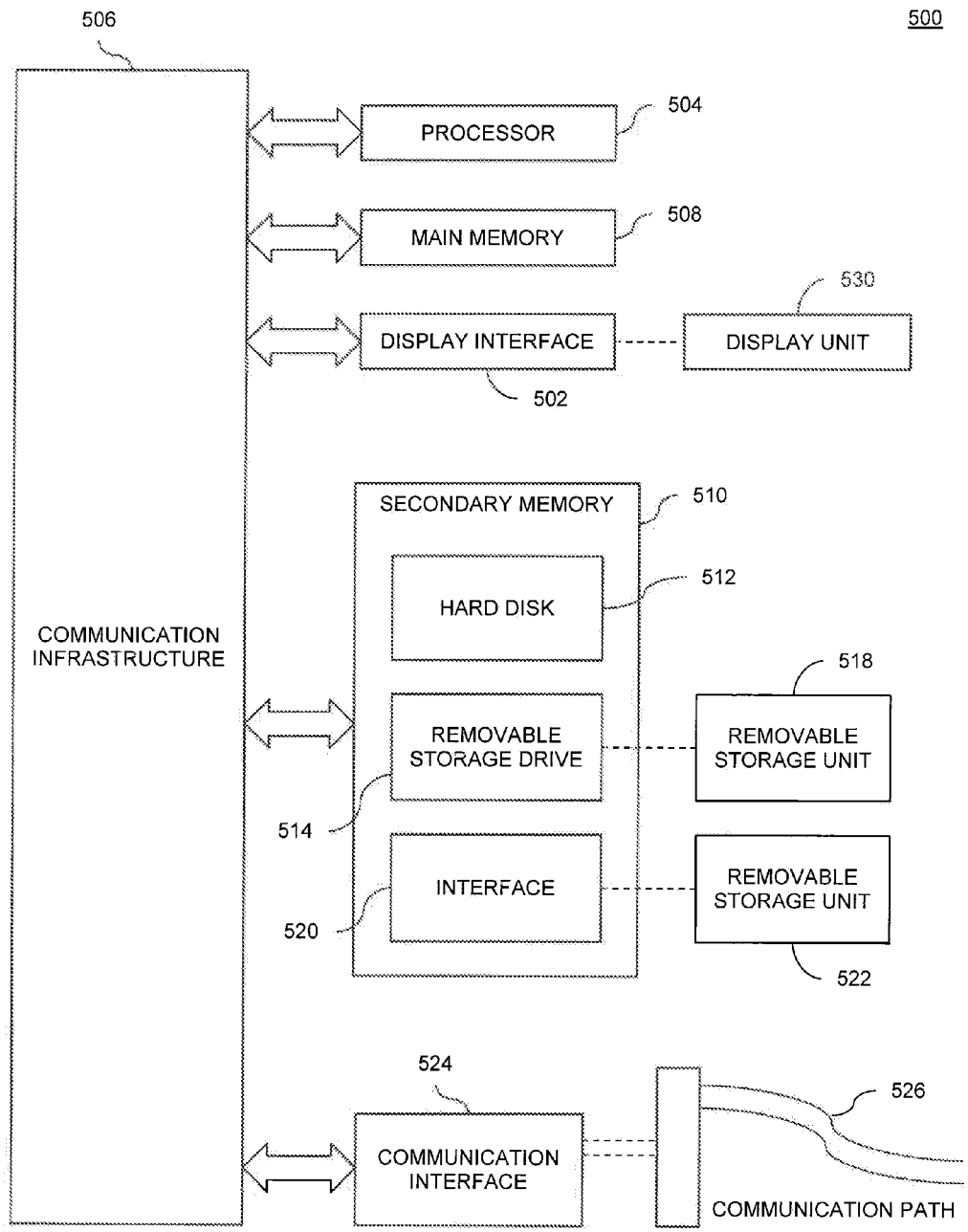
FIG. 5 illustrates an example computer in which embodiments of the present disclosure, or portions thereof, may be implemented as computer-readable code.

FIG. 5 illustrates an example computer system 500 in which embodiments of the present disclosure, or portions thereof, may be implemented. For example, map server 101, advertisement database 106, map database 107, panoramic image database 108, and client device 120 may be implemented in one or more computer systems 500 using hardware, software, firmware, computer readable storage media having instructions stored thereon, or a combination thereof.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments are described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 504 may be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may include a floppy disk drive, a magnetic tape drive, an optical disk drive, a flash memory, or the like. The removable storage drive 514 reads from and/or writes to a removable storage unit 518 in a well-known mariner. Removable storage unit 518 may include a floppy disk, magnetic tape, optical disk, flash drive, etc. which is read by and written to by removable storage drive 514. As will be appreciated by persons skilled in the relevant art, removable storage unit 518 includes a computer readable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 518, removable storage unit 522, and a hard disk installed in hard disk drive 512. Computer storage medium and computer readable storage medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement the embodiments described herein. In particular, the computer programs, when executed, enable processor device 504 to implement the processes of the embodiments, such as the stages in the methods illustrated by flowchart 200 of FIG. 2, discussed above. Accordingly, such computer programs represent controllers of computer system 500. Where an embodiment is implemented using software, the software may be stored in a computer storage medium and loaded into computer system 500 using removable storage drive 514, interface 520, and hard disk drive 512, or communications interface 524.

Embodiments of the invention also may be directed to computer program products including software stored on any computer readable storage medium. Such software, when executed in one or more data processing device, causes a data processing device(s) to operate as described herein. Embodiments of the invention employ any computer useable or readable storage medium. Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

CONCLUSION

The Summary and Abstract sections may set forth one or more but not all exemplary embodiments as contemplated by the inventor(s), and thus, are not intended to limit the present invention and the appended claims in any way.

The foregoing description of specific embodiments so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:
1. A computer-implemented method for placing advertisements on photographic images of geolocations comprising:
retrieving, by at least one computer processor, a photographic image associated with a geolocation, wherein the geolocation is based on a user action;

retrieving, by the at least one computer processor, an advertisement to place on the photographic image, wherein the advertisement is retrieved based on at least the geolocation;

analyzing, by the at least one computer processor, pixels of the photographic image to determine a position on the photographic image for placing the advertisement, wherein analyzing the pixels of the photographic image includes locating background pixels, the background pixels including pixels that represent a background of the photographic image; and placing, by the at least one computer processor, the advertisement at the determined position in the background of the photographic image.

2. The computer-implemented method of claim 1, further comprising:

allowing the user to select the advertisement, wherein selecting the advertisement directs the user to information associated with the advertisement.

3. The computer-implemented method of claim 1, wherein the advertisement is retrieved based on the outcome of an auction, wherein the auction allows a plurality of advertisers to compete to place an advertisement on the photographic image.

4. The computer-implemented method of claim 1, wherein the advertisement is retrieved based on at least one target factor, the target factor including one or more of information associated with the user or information associated with an advertiser.

5. The computer-implemented method of claim 1, wherein the geolocation is based on the user selecting a point on a virtual map.

6. The computer-implemented method of claim 1, wherein the geolocation is based on the user selecting a point on an image of a geolocation.

7. The computer-implemented method of claim 1, wherein background pixels include pixels that represent a street captured in the photographic image.

8. The computer-implemented method of claim 1, wherein background pixels include pixels that are above a horizon line captured in the photographic image.

9. A system for placing advertisements on photographic images of geolocations comprising:

a map-image module, implemented on at least one computer processor, configured to retrieve a photographic image associated with a geolocation, wherein the geolocation is based on a user action;

an advertisement module, implemented on the at least one computer processor, configured to retrieve an advertisement to place on the photographic image, wherein the advertisement is retrieved based on at least the geolocation; and an advertisement placement module, implemented on the at least one computer processor, configured to:

analyze pixels of the photographic image to determine a position on the photographic image for placing the advertisement, wherein analyzing the pixels of the photographic image includes locating background pixels, the background pixels including pixels that represent a background of the photographic image; and placing the advertisement at the determined position in the background of the photographic image.

10. The system of claim 9, further comprising:
a user interface module configured to allow the user to select the advertisement, wherein selecting the advertisement directs the user to information associated with the advertisement.

11. The system of claim 9, wherein the advertisement module is further configured to retrieve the advertisement based on the outcome of an auction, wherein the auction allows a plurality of advertisers to compete to place an advertisement on the photographic image.

12. The system of claim 9, wherein the advertisement module is further configured to retrieve the advertisement based on at least one target factor, the target factor including one or more of information associated with the user or information associated with an advertiser.

13. The system of claim 9, wherein the geolocation is based on the user selecting a point on a virtual map.

14. The system of claim 9, wherein the geolocation is based on the user selecting a point on an photographic image of a geolocation.

15. The system of claim 9, wherein background pixels include pixels that represent a street captured in the photographic image.

16. The system of claim 9, wherein background pixels include pixels that are above a horizon line captured in the photographic image.

17. An apparatus comprising a non-transitory computer readable storage medium having instructions encoded thereon that, when executed by a computing device, causes the computing device to perform operations comprising:

retrieving a photographic image associated with a geolocation, wherein the geolocation is based on a user action;

retrieving an advertisement to place on the photographic image, wherein the advertisement is retrieved based on at least the geolocation;

analyzing pixels of the photographic image to determine a position on the photographic image for placing the advertisement, wherein analyzing the pixels of the photographic image includes locating background pixels, the background pixels including pixels that represent a background of the photographic image; and placing the advertisement at the determined position in the background of the photographic image.

18. The apparatus of claim 17, the apparatus further comprising:

allowing the user to select the advertisement, wherein selecting the advertisement directs the user to information associated with the advertisement.

19. The apparatus of claim 17, wherein the advertisement is retrieved based on the outcome of an auction, wherein the auction allows a plurality of advertisers to compete to place an advertisement on the photographic image.

20. The apparatus of claim 17, wherein the advertisement is retrieved based on at least one target factor, the target factor including one or more of information associated with the user or information associated with an advertiser.

21. The apparatus of claim 17, wherein the geolocation is based on the user selecting a point on a virtual map.

22. The apparatus of claim 17, wherein the geolocation is based on the user selecting a point on an photographic image of a geolocation.

23. The apparatus of claim 17, wherein background pixels include pixels that represent a street captured in the photographic image.

24. The apparatus of claim 17, wherein background pixels include pixels that are above a horizon line captured in the photographic image.

* * * * *